United States Patent
Accame et al.

(10) Patent No.: US 11,695,863 B2
(45) Date of Patent: *Jul. 4, 2023

(54) PROACTIVE CACHING OF TRANSIENT ASSISTANT ACTION SUGGESTIONS AT A FEATURE PHONE

(71) Applicant: Google LLC, Mountain View, CA (US)

(72) Inventors: Diego Accame, San Francisco, CA (US); Siddharth Jain, Karnataka (IN); Bartlomiej Borawski, Zurich (CH); Yujie Wan, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/588,669

(22) Filed: Jan. 31, 2022

(65) Prior Publication Data
US 2022/0159116 A1    May 19, 2022

Related U.S. Application Data

(63) Continuation of application No. 17/118,485, filed on Dec. 10, 2020, now Pat. No. 11,240,363, which is a
(Continued)

(30) Foreign Application Priority Data

May 6, 2019  (IN) .............................. 201921018023

(51) Int. Cl.
*H04W 4/021* (2018.01)
*H04M 1/724* (2021.01)
(Continued)

(52) U.S. Cl.
CPC .............................. *H04M 1/72403* (2021.01)

(58) Field of Classification Search
CPC ... H04M 1/724; H04M 1/72403; G06F 16/48; H04W 4/021
See application file for complete search history.

(56) References Cited

U.S. PATENT DOCUMENTS

| 6,343,317 B1 * | 1/2002 | Glorikian | ............ G06F 16/9537 709/229 |
| 9,116,986 B1 * | 8/2015 | Jackson | ............ G06Q 10/1095 |

(Continued)

OTHER PUBLICATIONS

European Patent Office; Communication issued in Application No. 21187764.2; 10 pages; dated Nov. 3, 2021.
(Continued)

*Primary Examiner* — Blane J Jackson
(74) *Attorney, Agent, or Firm* — Gray Ice Higdon

(57) ABSTRACT

Proactive caching, at a client device (e.g., a feature phone), of transient assistant action suggestions for selective rendering by an assistant client application of the client device. A transient assistant action suggestion, when rendered via an assistant client application and selected, causes the assistant client application to initiate performance of a corresponding assistant action. In various implementations, a prefetched transient action suggestion can be a time-constrained suggestion that includes at least associated rendering restriction metadata that defines one or more temporal windows to which rendering of the time-constrained suggestion is restricted. Proactive cache refresh rate metadata can also be associated with transient action suggestion(s) and defines a duration during which the assistant client application is to refrain from interfacing with a remote system to prefetch updated transient assistant action suggestions.

18 Claims, 6 Drawing Sheets

Related U.S. Application Data continuation of application No. 16/618,604, filed as application No. PCT/US2019/059812 on Nov. 5, 2019, now Pat. No. 10,897,529.

(51) Int. Cl.
*G06F 16/48* (2019.01)
*H04M 1/72403* (2021.01)

(56) References Cited

U.S. PATENT DOCUMENTS

| | | | |
|---|---|---|---|
| 9,514,111 | B1 | 12/2016 | Cornea et al. |
| 9,892,426 | B2 | 2/2018 | Batraski et al. |
| 9,979,796 | B1 | 5/2018 | Yellin et al. |
| 10,091,327 | B2 * | 10/2018 | Chen ................ G06Q 50/01 |
| 10,535,005 | B1 * | 1/2020 | Badr ................ G06F 21/44 |
| 10,897,529 | B2 | 1/2021 | Accame et al. |
| 2007/0192318 | A1 | 8/2007 | Ramer et al. |
| 2015/0106364 | A1 | 4/2015 | Schpok |
| 2015/0365787 | A1 | 12/2015 | Farrell |
| 2016/0021211 | A1 | 1/2016 | Yellin et al. |
| 2016/0028637 | A1 | 1/2016 | Vasseur et al. |
| 2016/0323236 | A1 | 11/2016 | Renaud |
| 2017/0098159 | A1 | 4/2017 | Sharifi et al. |
| 2018/0174058 | A1 | 6/2018 | Vrati et al. |
| 2018/0357686 | A1 | 12/2018 | Blair, II et al. |
| 2019/0087058 | A1 | 3/2019 | Leong et al. |

OTHER PUBLICATIONS

European Patent Office; Communication under Rule 71(3) EPC issued in Application No. 19835928.3; 59 pages; dated Mar. 12, 2021.

European Patent Office; Communication Pursuant to Article 94(3)EPC; 4 pages; dated Nov. 26, 2020.

European Patent Office; International Search Report and Written Opinion of PCT application No. PCT/US2019/059812; 13 pages; dated Apr. 6, 2020.

Intellectual Property India; Examination Report issued in Application No. 201921018023; 9 pages; dated Jan. 17, 2023.

* cited by examiner

PROACTIVE CACHING OF TRANSIENT ASSISTANT ACTION SUGGESTIONS AT A FEATURE PHONE

BACKGROUND

The term "feature phone" is a retronym used to describe a class of handheld computers that lack the full range of capabilities of modern smartphones. A feature phone often lacks a touchscreen, opting instead for a non-touch display (e.g., backlit LCD screen) and a physical keyboard and/or physical navigation button(s). Feature phones can further include low-quality microphone(s), low-quality camera(s), hardware for Wi-Fi connectivity, hardware for broadband cellular network connectivity (e.g., 3G, 4G, and/or 5G), and/or global positioning system (GPS) components.

Mobile operating systems have been developed for feature phones that enable applications to be downloaded and installed (and/or preloaded). The applications can be, for example, HTML 5 based applications that can be used with JavaScript. One non-limiting example of such an operating system is the Linux-based mobile operating system KaiOS, developed by Kai OS Technologies Inc. Many feature phones, via HTML 5 based applications, enable users to experience functionality that is similar to that experienced on modern smartphone, but with less hardware resource usage (e.g., less memory usage, less processor usage, etc.).

Although HTML 5 based applications executed by a feature phone operating system can offer reduced hardware usage (compared to their modern smartphone counterparts), feature phone operating systems and/or limited hardware resources of feature phones also present technical challenges for effectively implementing various applications. One example of such an application is referred to herein as an "assistant client application" (and also sometimes referred to as an "automated assistant client application", an "interactive personal assistant application," an "intelligent personal assistant application," a "personal voice assistant application," etc.).

SUMMARY

Implementations disclosed herein are directed to proactive caching, at a feature phone or other client device, of transient assistant action suggestions for selective rendering by an assistant client application of the device. The assistant client application at least selectively interacts with remote assistant component(s) to provide automated assistant functionalities via the assistant client application of the feature phone or other client device. A transient assistant action suggestion (also referred to herein as a "transient action suggestion"), when rendered via an assistant client application and selected by user input at the feature phone, causes the assistant client application to initiate performance of a corresponding assistant action (optionally by way of interaction with remote assistant component(s)).

In various implementations, metadata for the transient action suggestion includes corresponding action metadata that differs from text and/or other content (e.g., images) of the transient action suggestion. In those implementations, the action metadata is utilized to initiate performance of the corresponding assistant action. For example, action metadata can be transmitted to remote automated assistant component(s) to initiate the action. The action metadata can include, for example, alternate text or more concise content that is mapped (directly or indirectly), at the remote automated assistant component(s), to the corresponding assistant action. In situations where the action metadata is more concise than the text and/or other content of the transient action suggestion, and the transient action suggestion is selected via non-voice input, a more data efficient transmission to the remote automated assistant component(s) can be utilized to initiate the corresponding assistant action. This benefit of more efficient data transmission can be achieved with any user device including, but not limited, to a feature phone described in some examples herein. More efficient data transmission can also improve implementations in situations or locations with poor network conditions, such as poor or non-existent network connectivity. Moreover, in various implementations the assistant action is a local assistant action, in that it can be executed locally at the feature phone (or other user device)—despite the transient action suggestion itself not being directly executable at the feature phone. In those implementations, the action metadata can be utilized directly by the feature phone to execute the action, without requiring communication with remote automated assistant component(s). As one example, the transient action suggestion can be "take a selfie", and the action metadata can be executed directly by the feature phone to cause a camera application of the feature phone (or a camera feature of the assistant client application) to be automatically opened with a view from a front-facing camera of the feature phone. Due to constraints of the feature phone, user input of "take a selfie" would itself not be directly executable by the feature phone, without the feature phone communicating with remote automated assistant component(s) that can interpret the user input and provide a corresponding action in response. On the other hand, by having the action metadata locally cached and associated with the "take a selfie" transient action suggestion, the corresponding action can be directly executed responsive to selection of the transient action suggestion—with reduced latency and without the feature phone communicating with remote automated assistant component(s) in determining the corresponding action. This can be beneficial in situations or locations with poor network conditions, such as poor or non-existent network connectivity.

As described in more detail herein, the proactive cache of a feature phone in which transient action suggestions are stored is "proactive" in that the transient action suggestions are not stored in the proactive cache responsive to having been recently requested at the feature phone based on user input. Rather, the transient action suggestions are proactively prefetched from a remote server and then stored in the proactive cache—despite potentially never having been previously requested or selected at the feature phone. In some implementations, the transient action suggestions can be provided responsive to the prefetch request in response to a determination, at the remote server, that the transient action suggestions have at least a threshold likelihood of being selected at the feature phone in the future. Moreover, and as also described in more detail herein, the transient action suggestions are "transient" in that they (and/or their corresponding metadata) are only stored in the proactive cache for a short duration (e.g., less than 10, 7, 5, 3, or 1 days) before being removed, and/or being replaced with updated transient action suggestions (and/or updated corresponding metadata). As also described herein, in some implementations the corresponding metadata for transient action suggestion(s) can directly (e.g., in the case of timestamp metadata and time to live) or indirectly (e.g., in the case of proactive cache refresh rate metadata) define their duration within the proactive cache.

In proactively caching transient action suggestions, an assistant client application selectively interfaces with a remote automated assistant system to prefetch the transient action suggestions and corresponding metadata. The assistant client application then writes the prefetched transient action suggestions, and the corresponding metadata, to a proactive cache in local storage of the feature phone, or of another user device. When the assistant client application is subsequently executing and in a state in which action suggestions are to be provided (e.g., an initial invocation state, or a state following certain responses), the proactive cache can be accessed to efficiently select and render one or more of the transient action suggestions. By selecting the transient action suggestions from the local proactive cache, they can be rendered with minimal latency (e.g., since they don't have to be actively retrieved from a remote system) and/or can be rendered in situations in which network connectivity is poor or non-existent (thereby preventing timely active retrieval of suggestion(s) from remote system(s)). The benefits of minimal latency when rendering and/or the ability for rendering in situations or locations with poor network conditions can be achieved with any user device including, but not limited, to a feature phone. For example, a user device may be operating in a "low power" mode, and the performance of advanced pre-storing as described herein can assist in providing the user device with power saving features without affecting responsiveness of the device.

In various implementations, a prefetched transient action suggestion can be a time-constrained suggestion that includes at least associated rendering restriction metadata. The rendering restriction metadata defines one or more temporal windows (e.g., specific dates, specific day(s) of the week, and/or specific time(s) of day) to which rendering of the time-constrained suggestion is restricted. Accordingly, the assistant client application can reference such rendering restriction metadata in determining whether to select the time-constrained suggestion for rendering—refraining from selecting it at time(s) that fail to conform to the temporal window(s) defined by the rendering restriction metadata and at least selectively (and potentially always) selecting it at time(s) that conform to the temporal window(s). Utilization of such rendering restriction metadata enables the time-constrained suggestion to be stored in the proactive cache in advance of it being relevant, yet rendered with minimal latency when relevant (as defined by the rendering restriction metadata)—and efficiently ignored for rendering when not relevant (thereby preventing computationally wasteful rendering of an irrelevant suggestion).

Moreover, utilization of the rendering restriction metadata overcomes one or more constraints of feature phones and/or operating systems of feature phones. As one non-limiting example, feature phone operating systems in particular often enable a limited quantity of applications (e.g., a single application) to be executing in the foreground of the operating system at any given time, thereby preventing any applications from running in the background of the operating system (or only enabling a very limited number of applications to run in the background). Further, even when an application is executing in the foreground, the operating system and/or resource constraints (e.g., processor and/or memory constraints) can limit a quantity of parallel processes that can be performed by the application at a given time. Utilization of the rendering restriction metadata enables the time-constrained suggestion to be stored in advance of being relevant. Such advanced pre-storing is performed with the recognition that prefetching of transient action suggestions (and associated metadata) will be intermittent and, when employed on a feature phone, contingent on the automated assistant client application actually executing in the foreground and/or contingent on being "idle" while in the foreground or background (e.g., due to limitations on performance of parallel processes)—which can be a relatively infrequent occurrence. In this way, employing the advanced pre-storing described herein when the assistant client application is executing at a feature phone can help to overcome one or more constraints of feature phones and/or operating systems of feature phone.

Further, in view of the above and/or other constraints of feature phone(s), and/or in view of conserving utilization of network bandwidth, metadata prefetched with transient action suggestions can also include timestamp metadata. The timestamp metadata can define a time of prefetching the transient assistant action suggestions or a time of generating, by the remote system, of the transient assistant action suggestions. The timestamp metadata can be referenced, by the assistant client application, in ascertaining the age of associated transient action suggestion(s) in the proactive cache. Based on the age, the assistant client application can determine whether to remove stale transient action suggestion(s) from the cache (thereby freeing often limited storage resources of the feature phone), ignore stale transient action suggestion(s) in the cache (without necessarily immediately removing them), and/or whether to prefetch updated transient action suggestions and/or associated metadata (which can be further based on proactive cache refresh rate metadata described below). In determining whether to remove stale transient action suggestion(s) and/or ignore stale transient action suggestion(s), the assistant client application can optionally reference a time to live value. The time to live value can define a duration, or a threshold period of time, after which the transient action suggestions can be considered stale. For example, if a current time or timestamp is greater than the combination of the timestamp metadata (of a transient assistant action suggestion) and the duration defined by the time to live value, a time to live threshold can be considered to have been exceeded and the transient assistant action suggestion may not be rendered. Alternatively, the time to live value can define a timestamp reference, wherein the transient assistant action suggestion may only be rendered if the timestamp metadata is compared to the reference timestamp and the time to live threshold is not exceeded. For example, if the timestamp metadata is greater than the reference timestamp (or less than, depending on the specific configuration of the timestamps), a time to live threshold can be considered to have been exceeded and the transient assistant action suggestion may not be rendered. In some implementations, a time to live value can be provided as part of metadata retrieved during a prefetch—or provided as part of metadata retrieved during a separate asynchronous configuration retrieval (described in more detail below), and the time to live value can be assigned as metadata for one or more (e.g., all) of the transient action suggestions. A most recent time to live value provided to an assistant client application of a feature phone can supplant an immediately preceding time to live value and can vary from the immediately preceding time to live value. Thus, the time to live values utilized by the assistant application can vary over time, and can be generated by remote system(s) various considerations, such as characteristics of the most recently cached transient action suggestions.

Proactive cache refresh rate metadata can define a duration during which the assistant client application is to refrain from interfacing with a remote system to prefetch updated transient assistant action suggestions. For example, to conserve network bandwidth and/or client and/or server processing associated with prefetching transient action suggestions and/or associated metadata, the client assistant application can refrain from prefetching new updated transient assistant action suggestions and/or associated metadata every time it is executed. Rather, the rate of prefetching of new updated transient assistant action suggestions and/or associated metadata can, in some implementations, be based at least in part on the cache refresh rate metadata.

As described herein, in some implementations the proactive cache refresh rate metadata can be provided as part of the metadata prefetched along with the transient action suggestions. Additionally or alternatively, the proactive cache refresh rate metadata can be transmitted to a feature phone (or other client device) asynchronously relative to transient action suggestions prefetch requests. For example, the proactive cache refresh rate metadata can be provided responsive to a separate configuration retrieval by the automated assistant application. The configuration retrieval can, for example, be a transmission to a remote system that optionally includes an indication of current configuration settings including, but not limited to, current proactive cache refresh rate metadata and/or a current time to live value. Responsive to the transmission, and optionally only if the remote system determines current configuration settings indicated by the transmission differ from the updated configuration settings, the remote system can provide updated configuration settings. Optionally, the assistant client application can wait to implement any updated configuration settings until the assistant client application is closed (i.e., implement as part of the closing process) or until the assistant client application is again opened from a closed state (i.e., implement as part of the opening process).

In implementations where updated proactive cache refresh rate metadata and/or time to live value are provided asynchronously, this enables transient action suggestion refresh rate and/or transient action suggestion usage to be adjusted in a process that is separate from, and optionally more data efficient than, transient action suggestion prefetch requests. For example, configuration retrievals can, as compared to transient assistant action prefetch requests, be performed more frequently but with utilization of less network resources, less client resources, and/or less server resources. This can enable: increasing of the cache refresh rate responsive to a server-side determination that certain condition(s) have occurred (e.g., a change in temporal window(s) for time-constrained suggestions); altering of the time to live value responsive to a server-side determination that certain condition(s) have occurred (e.g., determining previously provided transient action suggestion(s) are stale due to dynamic events); decreasing of the cache refresh rate responsive to a server-side determination that certain condition(s) have occurred (e.g., network conditions have deteriorated and/or server load is excessive); etc. Moreover, proactive cache refresh rate metadata and/or a time to live value can optionally be adjusted and provided on a region-by-region basis, based on network and/or server conditions in the respective region and/or based on most recently provided transient action suggestions for the respective region. The region of a configuration retrieval can be a geographic region. The geographic region can be determined, for example, based on data included by the assistant application in the configuration retrieval transmission and/or based on an Internet Protocol address of the transmission.

In various implementations, cache refresh rate metadata can optionally be generated, at the remote system, based on one or more of the most recently prefetched transient action suggestions for a device and/or geographic region. For example, if all of the most recently prefetched transient action suggestions are static, then the cache refresh metadata can define a refresh rate that is a longer duration than a refresh rate that would be defined if one or more all of the most recently prefetched transient action suggestions are dynamic. For instance, if the transient action suggestions do not contain "time-constrained" suggestions (or at least only time-constrained with static window(s) (e.g., a "summer solstice suggestions")), cache refresh rate metadata can define a rate that causes checking for new suggestions (or at least new metadata) infrequently (e.g., every 5 days). On the other hand, if the transient action suggestions include a time-constrained suggestion that is "dynamic" (e.g., a "cricket match" suggestion or other sporting event suggestion with a dynamic start and/or end time), cache refresh rate metadata can define a rate that causes checking for new suggestions (or at least new metadata) more frequently (e.g., 2 times per day). Optionally, the cache refresh rate metadata that defines a rate that causes checking for new suggestions more frequently can be generated and provided responsive to determining that temporal window(s) for a time-constrained suggestion has actually changed (e.g., through interfacing with one or more additional systems). Thus, network and/or computational resources can be conserved by decreasing the rate in certain situations, while selectively increasing the rate in other situations to ensure that dynamic transient assistant action suggestions are only rendered when relevant through more frequent obtaining of updated transient action suggestions and/or associated metadata—thereby mitigating computationally wasteful rendering of an irrelevant suggestion.

As described herein, the assistant client application on the feature phone is configured to selectively interface with a remote system to selectively prefetch transient action suggestions and associated metadata. The assistant client application can interface with the remote system when the application is executing in the foreground of the feature phone. For example, the assistant client application can interface with the remote system as part of the opening procedure of the application and/or while the application is open, but idle. It will also be understood that the advanced pre-storing can be performed when the automated assistant client application is "idle", even when the application is not executing in the foreground of a user device (i.e. when it is executing in the background). As also described herein, the interfacing is selective and can be driven by timestamp metadata, cache refresh rate metadata, time to live value(s), and/or other consideration(s). Such consideration(s) can limit a quantity of interactions with the remote system by various feature phones, thereby conserving bandwidth that would otherwise be consumed by a greater quantity of interactions and/or conserving resources at the remote system that would otherwise be consumed by handling a greater quantity of interactions. Moreover, by performing the advanced pre-storing when the automated assistant client application is "idle", bandwidth can be used more effectively by the user device. Performance of the device may therefore be improved.

In interfacing with the remote system, the assistant client application prefetches new transient action suggestion(s) and/or metadata. In some implementations, new transient action suggestions and associated metadata are prefetched, and they fully supplant any existing suggestions and metadata stored in the proactive cache. In various implementations, the assistant client application can provide, to the remote system, an indication of transient action suggestion(s) and/or metadata that is currently stored in the proactive cache (e.g., via transmission of a token which is currently cached by the client device). The remote system can determine, based on the indication (for example, from the transmitted token), whether to provide: updated transient action suggestions and associated metadata for fully supplanting currently cached transient action suggestions and associated metadata in the proactive cache; only updated metadata for supplanting some or all of the metadata in the proactive cache; only updated transient action suggestions for supplanting only some of the transient action suggestions in the proactive cache; or updated transient action suggestions and associated metadata for supplanting only some of the transient action suggestions and/or metadata in the proactive cache.

The above description is provided as an overview of various implementations described herein. Those, and other implementations, are described in more detail below.

In addition, some implementations include one or more processors of one or more computing devices (e.g., processor(s) of a client device such as a feature phone or of a server device), where the one or more processors are operable to execute instructions stored in associated memory, and where the instructions are configured to cause performance of any of the methods described herein. Some implementations also include one or more non-transitory computer readable storage media storing computer instructions executable by one or more processors to perform any of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
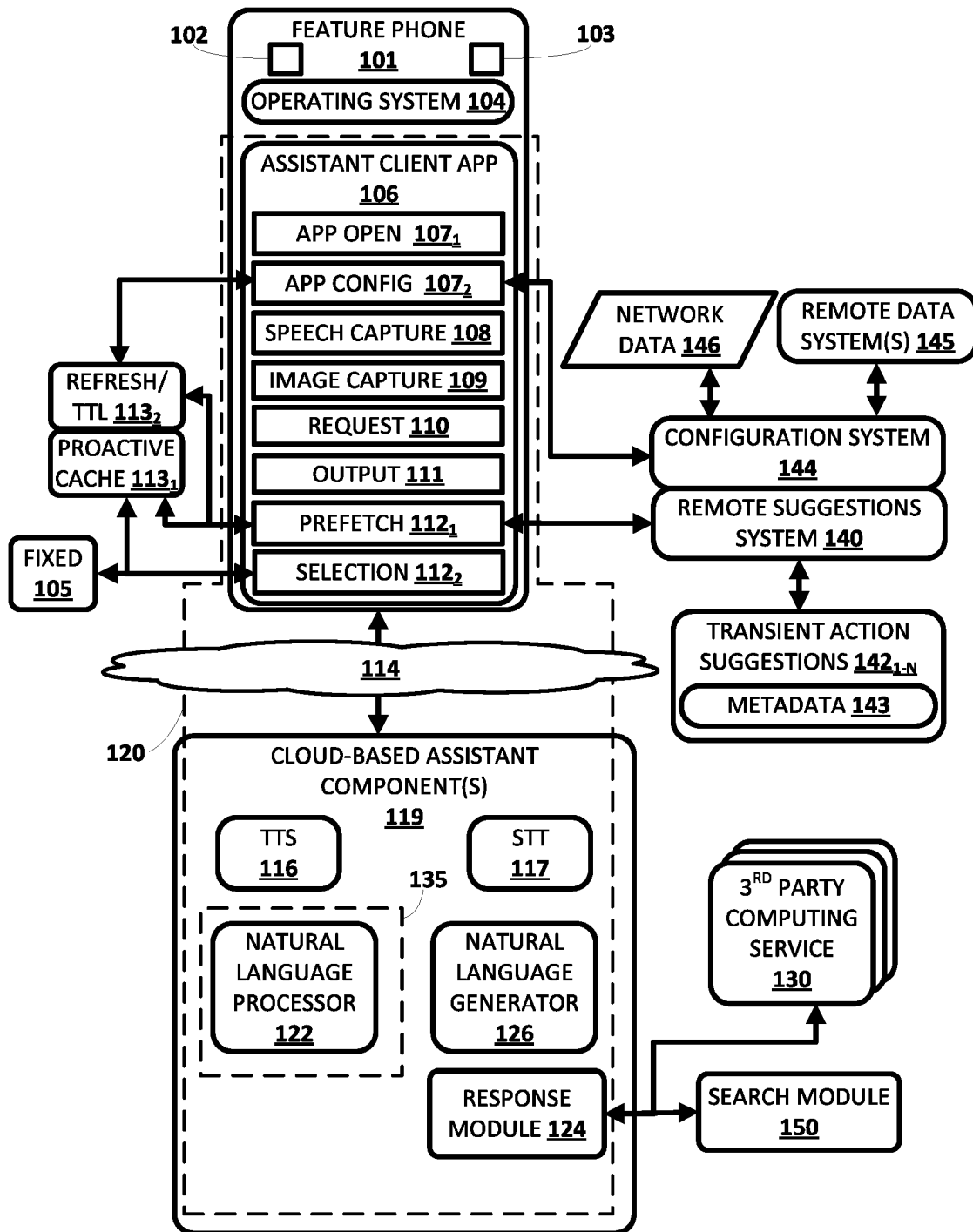
FIG. 1 is a block diagram of an example environment in which implementations disclosed herein can be implemented.

With reference to FIG. 1, an example environment is illustrated in which techniques disclosed herein can be implemented. The example environment includes a feature phone 101. While many examples described herein are described with respect to feature phones, it is understood that in various implementations techniques can be adapted for at least selective utilization with other client devices. For example, various techniques can be utilized with non-feature phones (such as modern smartphones or other touchscreen based client devices) responsive to the non-feature phones being in a low-power mode, being in an area with restricted network connectivity, and/or satisfying other conditions.

Feature phone 101 at least selectively executes automated assistant client application 106 (also referred to herein as "assistant client application 106" or "assistant client app 106"). Although assistant client application 106 is illustrated in FIG. 1 as separate from an operating system 104 of the feature phone 101, in various implementations assistant client application 106 can be integrated as part of operating system 104. Thus, the term "assistant client application" is utilized herein to reference either an assistant application that is installed on top of the operating system 104, or an assistant application that forms part of the operating system 104.

One or more cloud-based automated assistant components 119, which may also be referred to herein collectively as a "remote assistant server" of an automated assistant, may be implemented on one or more computing systems that are communicatively coupled to feature phone 101 via one or more local and/or wide area networks (e.g., the Internet) indicated generally at 114. Although the singular term "server" is used herein in referencing "remote assistant server", it is understood that in many implementations the "remote assistant server" is a collection of servers and/or other computing systems, such as one or more clusters of high-performance servers implemented using a cloud infrastructure.

In various implementations, an instance of assistant client application 106, by way of its interactions with one or more cloud-based automated assistant components 119, may form what appears to be, from the user's perspective, a logical instance of an automated assistant 120. One instance of such an automated assistant 120 is depicted in FIG. 1 in dashed line. It thus should be understood that a user that engages with an assistant client application 106 executing on feature phone 101 may, in effect, engage with his or her own logical instance of an automated assistant 120. For the sakes of brevity and simplicity, the term "automated assistant" as used herein as "serving" a particular user will refer to the combination of an assistant client application 106 executing on a feature phone 101 operated by the user and one or more cloud-based automated assistant components 119 (which may be shared amongst multiple assistant client application 106).

The feature phone 101 can be similar to a smartphone, but lack the full range of capabilities of modern smartphones. In various implementations, the feature phone 101 can lack a touchscreen, and instead include a non-touch display (e.g., backlit LCD screen) and a physical keyboard and/or physical navigation button(s). In various implementations, the feature phone 101 can additionally or alternatively include a mobile operating system 104 designed specifically for feature phones. Some such operating systems can restrict applications installed thereon from running in the background, or can severely limit the quantity of applications that can run in the background (e.g., allowing only one application to run in the background, or only allowing application(s) to run in the background if severely restricted memory usage limits are satisfied). Moreover, some such operating systems can additionally or alternatively require applications to utilize certain markup languages, such as HTML 5 that can be used with JavaScript.

In some implementations, feature phone 101 may be equipped with one or more vision sensors 102, although this is not required. Vision sensor(s) 102 may take various forms, such as a low-quality digital camera. The one or more vision sensors 102 may be used, e.g., by an image capture module 109, to capture image frame(s) (still image(s) or video) of an environment in which feature phone 101 is deployed. These image frames may then be transmitted to cloud-based assistant component(s) 119, as part of a request, assistant content generated by the cloud-based assistant component(s) 119 based on the image frame(s), and the assistant content returned to the assistant client application 106 for rendering. For example, an image that captures a leaf can be transmitted to the cloud-based assistant component(s) 119, and assistant content returned that identifies the plant from which the leaf originated, along with additional detail(s) on the plant.

Additionally, in many implementations feature phone 101 is equipped with one or more microphones 103. The microphone(s) 103 can detect audio data, such as audio data that captures spoken utterances of a user of the feature phone 101, ambient sound(s), etc. The detected audio data (optionally compressed) can be included along with a request, by assistant client application 106, to cloud-based assistant component(s) 119. For example, the detected audio data can be provided as streaming audio data to the cloud-based assistant component(s) 119 via a streaming channel established between the assistant client application 106 and the cloud-based assistant component(s) 119 in combination with a request. The cloud-based assistant component(s) 119 can, in some situations, transcribe the audio data by performing speech-to-text processing (e.g., via speech-to-text component 117 described below), and provide the transcribed text to assistant client application 106 for incorporation, by assistant client application 106, in a text entry field of another application that was active when the assistant client application 106 was invoked. The cloud-based assistant component(s) 119 can, in some other situations, transcribe the audio data by performing speech-to-text processing, generate an assistant request based on the transcription, obtain responsive assistant content based on the assistant request, and provide the responsive assistant content to assistant client application 106 for rendering by the assistant client application 106.

Feature phone 101 and computing device(s) operating cloud-based automated assistant components 119 can each include one or more memories for storage of data and software applications, one or more processors for accessing data and executing applications, and other components that facilitate communication over a network. The operations performed by cloud-based automated assistant component(s) 119 may be distributed across multiple computer systems. Cloud-based automated assistant component(s) 119 may be implemented as, for example, computer programs running on one or more computers in one or more locations that are coupled to each other through a network.

As noted above, in various implementations, feature phone 101 may operate an automated assistant client application 106, or "client portion" of automated assistant 120. In various implementations, automated assistant client application 106 may include an app open/invocation module 107$_1$, and app configuration module 107$_2$, a speech capture module 108, the image capture module 109, a request module 110, an output module 111, a prefetch module 112$_1$, and a selection module 112$_2$.

The app open/invocation module 107$_1$ can cause the assistant client application 106 to be invoked (e.g., opened and executed in the foreground of the operating system 104) in response to certain user interface input received at the feature phone 106, such as a long-press of a certain hardware button (e.g., a press of a multi-purpose hardware button that is longer than 1 second, 2 seconds, 3 seconds, or other threshold). As described herein, the operating system 104 may prevent assistant client application 106 from running in the background (ever, or in certain conditions) and when the app open module 107$_1$ opens the assistant application 107, it opens the assistant application 106 from a fully closed state.

App configuration module 107$_2$ can selectively perform configuration retrievals by interfacing with a remote configuration system 144. The remote configuration system 144 can be implemented as, for example, computer programs running on one or more computers in one or more locations that are coupled to each other through a network. The remote configuration system 144 can optionally be a component of the cloud-based assistant component(s) 119. The configuration retrievals can be performed when the assistant client application 106 is executing and optionally when the assistant client application 106 is idle and/or executing in the foreground. Optionally, the configuration retrievals can be restricted to being performed only once per execution of the assistant client application 106, only at a certain rate, and/or with other restrictions. As described herein, one or more of the configuration retrievals can be asynchronous with respect to prefetch requests performed by prefetch module 112$_1$, can be less resource intensive than prefetch requests performed by prefetch module 112$_1$, and/or can be performed more frequently than prefetch requests performed by prefetch module 112$_1$.

In response to a configuration retrieval from app configuration module 107$_2$, the configuration system 144 can optionally return one or more current configuration parameters to be utilized by the assistant client application 106. Those current configuration parameters can include, but are not limited to, proactive cache refresh rate metadata and/or a current time to live value described herein. At least a current proactive cache refresh rate metadata and/or a current time to live value can be stored locally at the feature phone 101, as indicated by refresh/TTL 113$_2$, for utilization by the prefetch module 112$_1$ as described herein. Optionally, the configuration retrieval can include an indication of currently active configuration parameters, to enable the remote configuration system 144 to determine whether one or more of the currently active configuration parameters are up to date. If all are up to date, the remote configuration system 144 can refrain from sending a response to the configuration retrieval, or send a minimal response that indicates no updated parameters are needed. If only some configuration parameters are not up to date, the remote configuration system 144 can send a response with just update configuration parameters for those that are not up to date. In some implementations, the app configuration module 107$_2$ can cause retrieved updated configuration parameters to be temporarily stored, but not committed (e.g., not stored for use by prefetch module 112$_1$ and/or other module(s)) until a committing condition occurs. The committing condition can be a close of the assistant client application 106 (and the configuration parameters committed as part of the close process), or a subsequent opening of the assistant client application 106 (and the configuration parameters committed as part of the open process).

The remote configuration system 144 can determine current proactive cache refresh rate metadata and/or a current time to live value based on various considerations. For example, one or both can be determined based on current load at the remote suggestions system 140, based on network conditions in a geographic area as determined from network data 146, and/or based on information from remote data system(s) 145 as compared to most recently provided transient action suggestions. For instance, the remote configuration system 144 can increase the duration indicated by the proactive cache refresh rate metadata (i.e., make prefetch requests less frequent) for prefetch requests from feature phones 101 in a certain geographic region based on determining that network conditions have degraded for the certain geographic region. Also, for instance, the remote configuration system 144 can increase the duration indicated by the proactive cache refresh rate metadata for prefetch requests from feature phones 101 in a certain geographic region additionally or alternatively based on determining that there is excess load on one or more components of remote suggestions system 140 that serve the certain geographic region, and/or that such component(s) are experiencing a failure or other critical issue. Also, for instance, the remote configuration system 144 can increase the duration indicated by the proactive cache refresh rate metadata for prefetch requests from feature phones 101 in a certain geographic region additionally or alternatively based on determining that most recently provided transient action suggestions for the certain geographic region (where the same transient action suggestions are provided to a set of feature phones in that certain geographic region) are static. As another example, the remote configuration system 144 can decrease the duration indicated by the proactive cache refresh rate metadata (i.e., make prefetch requests more frequent) for prefetch requests from feature phones 101 in a certain geographic region based on determining that most recently provided transient action suggestions for the certain geographic region are dynamic, have associated rendering restriction metadata that has changed, and/or include transient action suggestion(s) that are now irrelevant or otherwise considered stale. Thus, network and/or computational resources can be conserved by decreasing the proactive cache refresh rate in certain situations, while selectively increasing the rate in other situations. This ensures that transient assistant action suggestions are only rendered when relevant through more frequent obtaining of updated transient action suggestions and/or associated metadata— thereby mitigating computationally wasteful rendering of an irrelevant suggestion. Additionally or alternatively, this ensure that the rate is decreased in situations in which network and/or server conditions are degraded, preventing further degradation that would otherwise result absent the decrease in rate.

Speech capture module 108, which may be implemented using any combination of hardware and software, may interface with microphone(s) 103 to capture audio data corresponding to a user's utterance(s) and/or other audible sounds captured via microphone(s) 103. Further, speech capture module 108 can provide the audio data (e.g., a stream of the audio data and/or a recording of the audio data) to cloud-based assistant component(s) 119 along with a request, for further processing (e.g., for providing a transcription of the audio data, or an assistant response that is responsive to the audio data).

The image capture module 109, which may be implemented using any combination of hardware or software, may be configured to interface with vision sensor(s) 102 to capture one or more image frames (e.g., digital photographs) that correspond to a field of view of the vision sensor 102. Further, image capture module 109 can provide the image frame(s) to cloud-based assistant component(s) 119 along with a request, for further processing (e.g., for providing an assistant response).

Request module 110, which may be implemented using any combination of hardware and software, generates and transmits requests to cloud-based assistant component(s) 119, or to other component(s) of the feature phone 101 (e.g., separate applications, optionally via the operating system 104). The requests can include audio data captured by speech capture module 108, image data captured by image capture module 109, and/or can include a selected transient action suggestion and/or associated action metadata. For example, when user input selects a rendered (e.g., displayed) transient action suggestion, action metadata, that is mapped to the selected transient action suggestion, can be included in a request by the request module 110. Various user inputs can be utilized to select a given transient action suggestion. For example: hardware navigational buttons can be utilized to navigate to, and select the suggestion; a hardware button that corresponds to the transient action suggestion when it is rendered can be selected to select the suggestion; or the transient action suggestion or a label (e.g., a number or letter) assigned to the transient action suggestion can be spoken to select the suggestion.

Output module 111, which may be implemented using any combination of hardware and software, can cause transient action suggestion(s), selected by selection module $112_2$ (described below) to be rendered (e.g., graphically) in state(s) in which transient action suggestion(s) are to be provided. Such state(s) can include an initial state when the assistant client application 106 is first executed, a state that follows certain prior responses by the automated assistant (e.g., responses where no further server-provided suggestions related to that response are provided), and/or other state(s). In many implementations, the transient action suggestion(s) can be zero-state conversation starters that are provided in state(s) where no other contextually relevant suggestions have been provided by server-side component(s). The transient action suggestions can be selected by a user to cause performance of a corresponding action with minimal input.

Output module 111 can also receive responsive content from the cloud-based assistant component(s) 119 (where the responsive content is responsive to a request transmitted by request module 110). The responsive content can be, for example: responsive to spoken, typed, and/or image input; responsive to a transient action suggestion that is selected by user input after being rendered; or responsive to another selected action suggestion (that is not necessarily a transient action suggestion from the proactive cache $113_1$). The output module 111 further outputs the responsive content. In some implementations, the responsive content is assistant content, and the output module 111 causes the assistant content to be rendered via the assistant client application 106. The assistant content can include text, images, and/or other content to be visually rendered via a display of the feature phone 101, audio data (e.g., a text-to-speech version of text) to be rendered via speaker(s) of the feature phone, and/or other content to be rendered via a display, speaker(s), and/or other user interface output device(s). In yet other implementations, the responsive content can be assistant content that is not necessarily rendered by the assistant application and/or that is not based on content received from the cloud-based assistant component(s) 119 (e.g., it can be based on local performance of an assistant action). For example, in response to a user selection of a transient action suggestion of "call Mom", corresponding action metadata can be utilized by the output module 111 to cause the output module 111 to interface with a phone dialing application of the feature phone 101 to cause the phone dialing application to dial a contact with the name "Mom". Also, for example, in response to a user selection of a transient action suggestion of "turn on the lights", responsive assistant content can be provided to a third-party system that controls the "lights" to cause the lights to "turn on", and responsive assistant content can be provided that causes the output module 111 to confirm that the lights were turned on (e.g., audible content of "OK, lights are turned on").

The prefetch module $112_1$ selectively interfaces with remote suggestions system 140 to prefetch transient action suggestions and/or associated metadata. The prefetch module $112_1$ stores the prefetched transient action suggestions and/or associate metadata in a proactive cache $113_1$ for utilization by selection module $112_2$. The remote suggestions system 140 can be implemented as, for example, computer programs running on one or more computers in one or more locations that are coupled to each other through a network. The remote suggestions system 140 can optionally be a component of the cloud-based assistant component(s) 119.

In some implementations or for some prefetches, the prefetch module $112_1$ receives, from the remote suggestions system 140, new transient action suggestions and associated metadata, and fully supplants any existing suggestions and metadata stored in the proactive cache $113_1$ with the new transient action suggestions and associated metadata. In some implementations or for some prefetches, the prefetch module $112_1$ can provide, to the remote suggestions system 140, an indication of transient action suggestion(s) and/or metadata that is currently stored in the proactive cache (e.g., via transmission of a currently cached token). In those situations, the remote suggestions system 140 can determine, based on the indication, whether to provide: updated transient action suggestions and associated metadata for fully supplanting currently cached transient action suggestions and associated metadata in the proactive cache $113_1$; only updated metadata for supplanting some or all of the metadata in the proactive cache $113_1$; only updated transient action suggestions for supplanting only some of the transient action suggestions in the proactive cache $113_1$; or updated transient action suggestions and associated metadata for supplanting only some of the transient action suggestions and/or metadata in the proactive cache $113_1$. The remote suggestions system 140 can provide, to the prefetch module $112_1$, responsive to the prefetch request, an indication of which of the preceding actions should be performed by the prefetch module $112_1$ for the received transient action suggestions and/or metadata. The prefetch module $112_1$ can act in accordance with such an indication.

The prefetch module $112_1$ can optionally initiate a prefetch request responsive to determining that the assistant client application 106 is idle and/or executing in the foreground. Additionally or alternatively, the prefetch module $112_1$ can initiate the prefetch request based on locally stored proactive cache refresh rate metadata indicating that another prefetch request can occur. This can be based on comparing the proactive cache refresh rate metadata to timestamp metadata of transient action suggestions currently stored in the proactive cache $113_1$, or to a separate timestamp that indicates the last time a prefetch request occurred. The locally stored proactive cache refresh rate metadata is indicated in FIG. 1 as refresh/TTL $113_2$ and can be stored in the proactive cache $113_1$, or separate from the proactive cache $113_1$. The proactive cache refresh rate metadata can be retrieved by app configuration module $107_2$ as described herein, or could have been retrieved by the prefetch module $112_1$ in a prior prefetch.

In response to the prefetch request, the remote suggestions system 140 provides transient action suggestions $142_{1-N}$ and associated metadata 143. The associated metadata 143 can include rendering restriction metadata, timestamp metadata (or timestamp metadata can be generated by the assistant client app), action metadata, priority metadata, time to live value(s), and/or proactive cache refresh rate metadata. Although transient action suggestions $142_{1-N}$ are illustrated in FIG. 1, it is understood that different transient action suggestions will be provided at different times and/or in response to prefetch requests from different feature phones. For example, a first set of transient action suggestions can be provided for a first period responsive to all prefetch requests from a first geographic region, a unique second set of transient action suggestions can be provided for the first period responsive to all prefetch requests from a second geographic region, a unique third set of transient action suggestions can be provided for a second period (non-overlapping with the first period) to all prefetch requests from the first geographic region, etc. Thus, different transient action suggestions can be provided in dependence on the time of the prefetch request and/or the geographic location of the feature phone transmitting the prefetch request. The remote suggestions system 140 can optionally generate the transient action suggestions $142_{1-N}$ for a given time period and/or for a given geographic region based on determining that they have at least a threshold likelihood of being selected at feature phones in the geographic region. This can be based on currently trending assistant inputs (optionally specific to a geographic region), historical assistant inputs (optionally specific to a geographic region), and/or other factor(s). Although the remote suggestions system 140 and the remote configuration system 144 are illustrated as separate from one another and from cloud-based assistant components, in various implementations one or more (e.g., all) of the components may form part of a cohesive system and/or interface with one another (e.g., via one or more APIs).

One or more of the transient action suggestions $142_{1-N}$ can be a time-constrained suggestion that includes at least associated rendering restriction metadata. The rendering restriction metadata defines one or more temporal windows (e.g., specific dates, specific day(s) of the week, and/or specific time(s) of day) to which rendering of the time-constrained suggestion is restricted. For example, a time-constrained suggestion can be "traffic conditions for work route" and can be associated with rendering restriction metadata that restricts its rendering to weekdays between 6:00 AM and 9:00 AM. Also, for example, a time-constrained suggestion can be "election day information" and can be associated with rendering restriction metadata that restricts its rendering to the day of local elections, and optionally the day before local elections. As yet another example, a time-constrained suggestion can be "cricket match score" and can be associated with rendering restriction metadata that restricts its rendering to one or more anticipated start times and one or more anticipated end times of the cricket match. The remote suggestions system 140 can optionally determine the temporal window(s) with reference to one or more remote data systems 145.

Moreover, the remote suggestions system 140 can determine, through interaction with one or more of the remote data systems 145, changes to dynamic temporal window(s)

for a time-constrained suggestion, and update the rendering restriction metadata to reflect the updated temporal window(s). In many implementations such updated rendering restriction metadata will not be proactively pushed to the corresponding feature phones previously provided with the now outdated rendering restriction metadata (e.g., in view of constraints of feature phones). However, updated proactive cache refresh metadata (indicating an increased rate) can be provided to one or more of the corresponding feature phones by the remote configuration system 144, responsive to corresponding configuration requests. This will, in turn, cause the corresponding assistant applications to increase their rate of prefetch requests and obtain the updated rendering restriction metadata in a subsequent prefetch request. Thus, in various implementations configuration system 144 and proactive suggestions system 140 can interact to cause configuration system 144 to provide updated proactive cache refresh rate data responsive to changes to transient assistant action suggestion(s) and/or metadata by remote suggestions system 140.

The selection module $112_2$ selects assistant action suggestions for the output module 111 to render when the assistant client application 106 is in a state in which assistant action suggestions are to be provided. The selection module $112_2$ can select the assistant action suggestions responsive to the assistant client application 106 being in such a state, or in anticipation of it being in such a state. In some implementations, the selection module $112_2$ prioritizes selection of transient action suggestions from proactive cache $113_1$ over non-transient action suggestions, indicated as fixed 105 in FIG. 1. Non-transient action suggestions 150 can be fixed and stored for a long duration, and can be fallback suggestions that are optionally only selected if no transient action suggestions are available in proactive cache $113_1$, or are available but have timestamp data that is older than a time to live value (i.e. the timestamp data exceeds a time to live threshold). In some implementations, the selection module $112_2$ always selects any time-constrained suggestions whose associated rendering restriction metadata enables their rendering.

In some implementations, the selection module $112_1$ selects a subset of the transient action suggestions, where a quantity in the subset is fixed, or determined based on the current state of the assistant client application. When there are a greater quantity of transient action suggestions (that can be rendered based on a time to live value and rendering restriction metadata) than the quantity of the subset, the selection module $112_2$ can utilize one or more techniques to select the subset from that greater quantity. For example, the selection module $112_2$ can randomly (truly random, or pseudo-random) select the subset from the greater quantity. Also, for example, the selection module $112_2$ can initially select any transient action suggestions that have not yet been rendered at the feature phone 101, then randomly select from already rendered transient action suggestions if necessary. Also, for example, the transient action suggestions can each optionally be associated with corresponding priority metadata that can be referenced in the selection. For instance, one or more may have highest priority metadata, one or more may have medium priority data, and one or more may have lowest priority metadata. The selection module $112_2$ can select the highest priority metadata transient action suggestions first, followed by the medium priority, then the lowest priority. In the case that a selection between multiple common-priority transient action suggestions needs to be made, the selection module $112_2$ can optionally randomly make the selection.

After the selection module $112_2$ selects the action suggestions(s), they are provided to output module 111 for rendering as described herein. In response to a selection of one of the rendered action suggestion(s), the request module 110 can cause a corresponding assistant action to be performed. In some implementations, the rendered transient actions suggestions are each associated with corresponding action metadata, and the request module 110 utilizes the corresponding assistant action in causing the corresponding assistant action to be performed. This can include local performance of the corresponding assistant action, based on the action metadata, and/or transmission of the corresponding action metadata to cloud-based assistant component(s) 119. The cloud-based assistant component(s) 119 can map the action metadata to a corresponding assistant action, and perform the corresponding assistant action.

Cloud-based assistant component(s) 119 include speech-to-text ("STT") module 117, and text-to-speech ("TTS") module 116. STT module 117 can process audio data, received with a request, and convert spoken input included therein into text (thereby creating a transcription of the spoken input). In various implementations, the STT module 117 has access to various STT models, optionally each conforming to a different language and/or dialect, and can select a subset (e.g., one) of those based on data included with the corresponding request by request module 111.

TTS module 116 may be configured to convert textual data (e.g., natural language responses formulated by automated assistant 120) into computer-generated speech output. In some implementations, TTS module 116 may provide the computer-generated speech output to feature phone 101 to be output directly, e.g., using one or more speakers. For example, the computer generated speech output can be provided as all or part of responsive content in response to a user selection of a rendered transient action suggestion.

The cloud-based automated assistant component(s) 119 also include an intent matcher 135 that can be configured to determine an intent of a request based on a transcription of audio data provided with the request, context data provided with the request, and/or based on other signals, such as sensor signals, online signals (e.g., data obtained from web services), and so forth. In various implementations, the intent matcher 135 can map action metadata, received responsive to selection of a corresponding transient action suggestion, to a corresponding intent. In some implementations, intent matcher 135 may include a natural language processor 122. Natural language processor 122 may be configured to process transcribed audio data, typed natural language input generated by user(s) via feature phone 101, natural language that is included in action metadata, etc.— and may generate annotated output (e.g., in textual form) for use by one or more other components of automated assistant 120. The generated annotated output includes one or more annotations of the natural language input and one or more (e.g., all) of the terms of the natural language input.

Intent matcher 135 may use various techniques to determine an intent. In some implementations, intent matcher 135 may have access to one or more databases (not depicted) that include, for instance, a plurality of mappings between: grammars, and responsive actions (or more generally, intents); action metadata and responsive actions; and/or other mapping(s). In many cases, these grammars may be selected and/or learned over time, and may represent the most common intents of users. For example, one grammar, "play <artist>", may be mapped to an intent that invokes a responsive action that causes music by the <artist> to be played on the feature phone 101 operated by the user.

Another grammar, "[weather|forecast] today," may be match-able to user queries such as "what's the weather today" and "what's the forecast for today?"

In addition to or instead of grammars, in some implementations, intent matcher 135 may employ one or more trained machine learning models, alone or in combination with one or more grammars. These trained machine learning models may also be stored in one or more databases and may be trained to identify intents, e.g., by embedding data indicative of a user's utterance and/or any detected user-provided visual cues into a reduced dimensionality space, and then determining which other embeddings (and therefore, intents) are most proximate, e.g., using techniques such as Euclidean distance, cosine similarity, etc.

In some implementations, automated assistant 120 may serve as an intermediary between users and one or more third party computing services 130 (or "third party agents", or "agents"). These third party computing services 130 may be independent software processes that receive input and provide responsive output. Some third party computing services may take the form of third party applications that may or may not operate on computing systems that are separate from those that operate, for instance, cloud-based automated assistant components 119. One kind of user intent that may be identified by intent matcher 135 is to engage a third party computing service 130. For example, automated assistant 120 may provide access to an application programming interface ("API") to a service for controlling a smart device. A user may invoke automated assistant 120 and select a rendered transient action suggestion such as "Turn the heating on." Intent matcher 135 may map this transient action suggestion, or associated action metadata, to a grammar that triggers automated assistant 120 to engage with the third party service, thereby to cause the user's heating to be switched on.

Response module 124 may be configured to receive the predicted/estimated intent that is output by intent matcher 135, as well as an associated slot values (whether provided by the user proactively or solicited from the user) and fulfill (or "resolve") the intent. In various implementations, fulfillment (or "resolution") of the user's intent may cause various fulfillment information (also referred to as "responsive" information or "resolution information") to be generated/obtained, e.g., by response module 124. As will be described below, the fulfillment information may in some implementations be provided to a natural language generator 126, which may generate natural language output based on the fulfillment information.

Fulfillment (or "resolution") information may take various forms because an intent can be fulfilled (or "resolved") in a variety of ways. Suppose a user requests pure information, such as "Where were the outdoor shots of 'The Shining' filmed?" The intent of the user may be determined, e.g., by intent matcher 135, as being a search query. The intent and content of the search query may be provided to response module 124, which as depicted in FIG. 1 may be in communication with one or more search modules 150 configured to search corpuses of documents and/or other data sources (e.g., knowledge graphs, etc.) for responsive information. Response module 124 may provide data indicative of the search query (e.g., the text of the query, a reduced dimensionality embedding, etc.) to search module 150. Search module 150 may provide responsive information, such as GPS coordinates, or other more explicit information, such as "Timberline Lodge, Mt. Hood, Oreg." This responsive information may form part of the fulfillment information generated by response module 124.

Additionally or alternatively, response module 124 may be configured to receive, e.g., from intent matcher 135, a user's intent and any slot values provided by the user or determined using other means (e.g., GPS coordinates of the user, user preferences, etc.) and trigger a responsive action. Responsive actions may include, for instance, ordering a good/service, starting a timer, setting a reminder, initiating a phone call, playing media, sending a message, etc. In some such implementations, fulfillment information may include slot values associated with the fulfillment, confirmation responses (which may be selected from predetermined responses in some cases), etc.

Natural language generator 126 may be configured to generate and/or select natural language output (e.g., words/phrases that are designed to mimic human speech) based on data obtained from various sources. In some implementations, natural language generator 126 may be configured to receive, as input, fulfillment information associated with fulfillment of an intent, and to generate natural language output based on the fulfillment information. Additionally or alternatively, natural language generator 126 may receive information from other sources, such as third party applications (e.g., required slots), which it may use to compose natural language output for the user.

Figure 2:
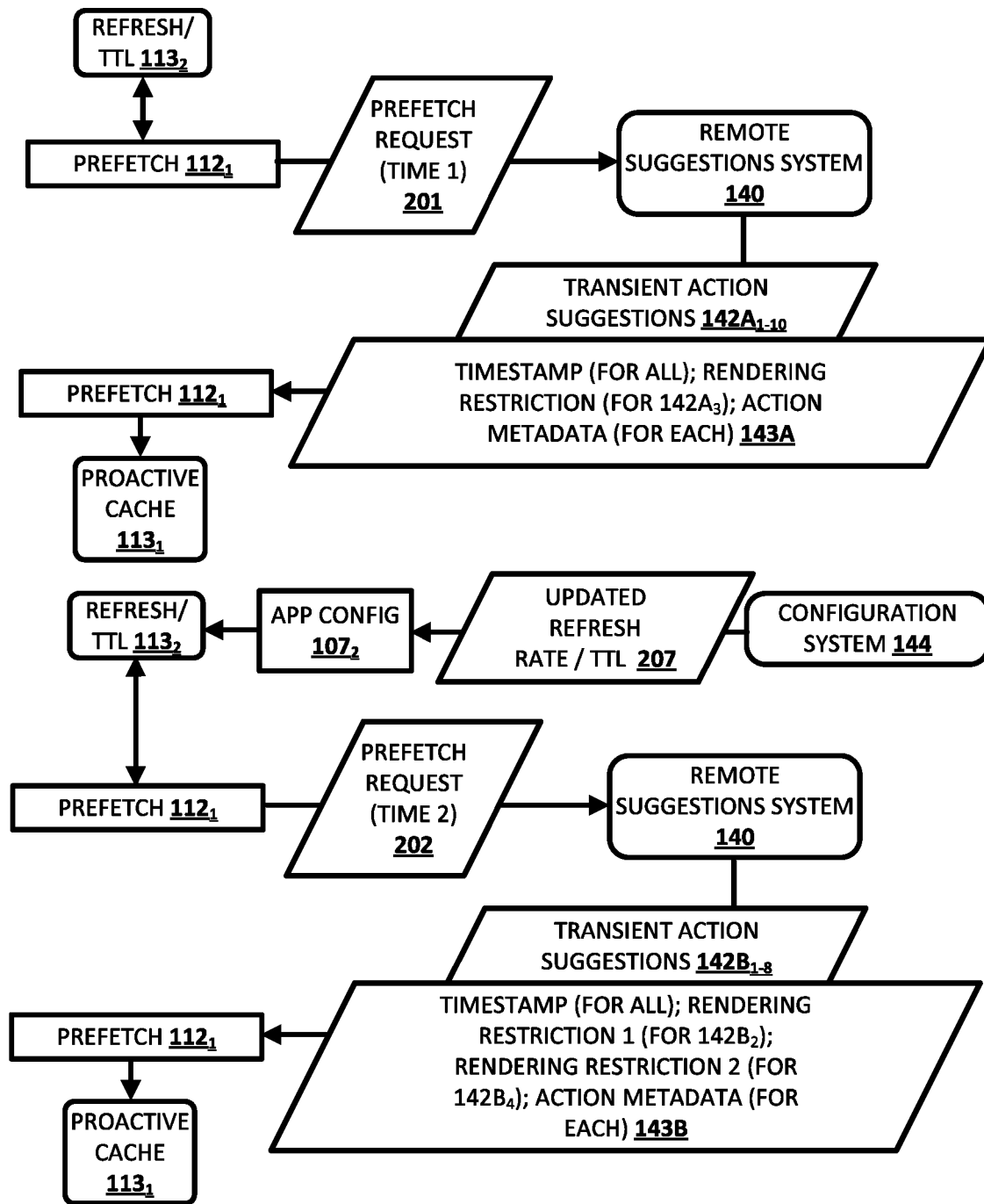
FIG. 2 depicts an example of prefetch requests, how the transient action suggestions and metadata that is prefetched can vary between prefetch requests, and how the rate of the prefetch requests can vary based on cache refresh metadata.

Turning now to FIG. 2, an example of two prefetch requests 201 and 202 is illustrated. In FIG. 2, the prefetch module $112_1$ transmits the prefetch request 201 at a first time. The first time at which the prefetch module $112_1$ transmits the prefetch request 201 can be based at least in part on current proactive cache refresh rate metadata that is stored locally as indicated by $113_2$. For example, the current proactive cache refresh rate metadata can define a duration of 24 hours, and the prefetch module $112_1$ can transmit the prefetch request 201 in response to determining at least 24 hours have passed since the last prefetch request. The current proactive cache refresh rate metadata may have been previously provided, by configuration system 144, in response to a prior configuration retrieval by app configuration module $107_2$.

In response to the prefetch request 201, the remote suggestions system provides transient action suggestions $142_{A1-10}$ and corresponding metadata 143A. The metadata 143A includes timestamp metadata for all of the transient action suggestions $142A_{1-10}$, rendering restriction metadata for a time-constrained transient action suggestion $142A_3$, and corresponding action metadata for each of the transient action suggestions $142A_{1-10}$. The prefetch module $112_1$ receives the transient action suggestions $142A_{1-10}$ and corresponding metadata 143A, and stores both in the proactive cache $113_1$. For example, the prefetch module $112_1$ can cause the transient action suggestions $142A_{1-10}$ and corresponding metadata 143A to supplant, in the proactive cache $113_1$, any existing transient action suggestions and associated metadata.

Subsequent to the prefetch request 201, but prior to any further prefetch requests, the app configuration module $107_2$ receives, from configuration system 144, updated proactive cache refresh rate metadata and optionally an updated time to live value 207. The app configuration module $107_2$ can receive the updated proactive cache refresh rate metadata and/or the updated time to live value 207 responsive to a configuration retrieval as described herein. The app configuration module $107_2$ stores the updated proactive cache refresh rate metadata and optionally the updated time to live value 207, replacing the previous proactive cache refresh rate metadata and optionally the previous time to live value. For example, the previous proactive cache refresh rate metadata may have defined a duration of 24 hours, and the updated duration can be 3 hours. Such an updated proactive cache refresh rate metadata may be provided, for example, responsive to a server-side determination that a temporal window associated with time-constrained suggestion $142_{A3}$ has changed, responsive to a server-side determination that new timely transient action suggestions are available, and/or other consideration(s). As another example, the previous proactive cache refresh rate metadata may have defined a duration of 24 hours, and the updated duration can be 36 hours. Such an updated proactive cache refresh rate metadata may be provided, for example, responsive to a server-side determination that network and/or server resources have deteriorated.

Subsequent to the app configuration module $107_2$ receiving the updated data 207, the prefetch module $112_1$ transmits the prefetch request 202 at a second time. The second time is based at least in part on the updated current proactive cache refresh rate metadata most recently stored locally, as indicated by $113_2$. For example, the updated current proactive cache refresh rate metadata can define a duration of 3 hours, and the prefetch module $112_1$ can transmit the prefetch request 202 in response to determining at least 3 hours have passed since the last prefetch request.

In response to the prefetch request 202, the remote suggestions system provides transient action suggestions $142B_{1-8}$ and corresponding metadata 143B. The metadata 143B includes timestamp metadata for all of the transient action suggestions $142B_{1-8}$, rendering restriction metadata for time-constrained suggestion $142B_2$, separate rendering restriction metadata for time-constrained suggestion $142B_4$, and corresponding action metadata for each of the transient action suggestions $142B_{1-8}$. The time-constrained suggestion $142B_2$ can optionally be the same as the time-constrained suggestion $142A_3$, but the corresponding rendering restriction metadata can differ (e.g., it can be updated based on an updated time window determined at the remote suggestions system 140). The prefetch module $112_1$ receives the transient action suggestions $142B_{1-8}$ and corresponding metadata 143B, and stores both in the proactive cache $113_1$. For example, the prefetch module $112_1$ can cause the transient action suggestions $142B_{1-8}$ and corresponding metadata 143B to supplant, in the proactive cache $113_1$, the transient action suggestions $142_{A1-10}$ and the metadata 143A.

Figure 3:
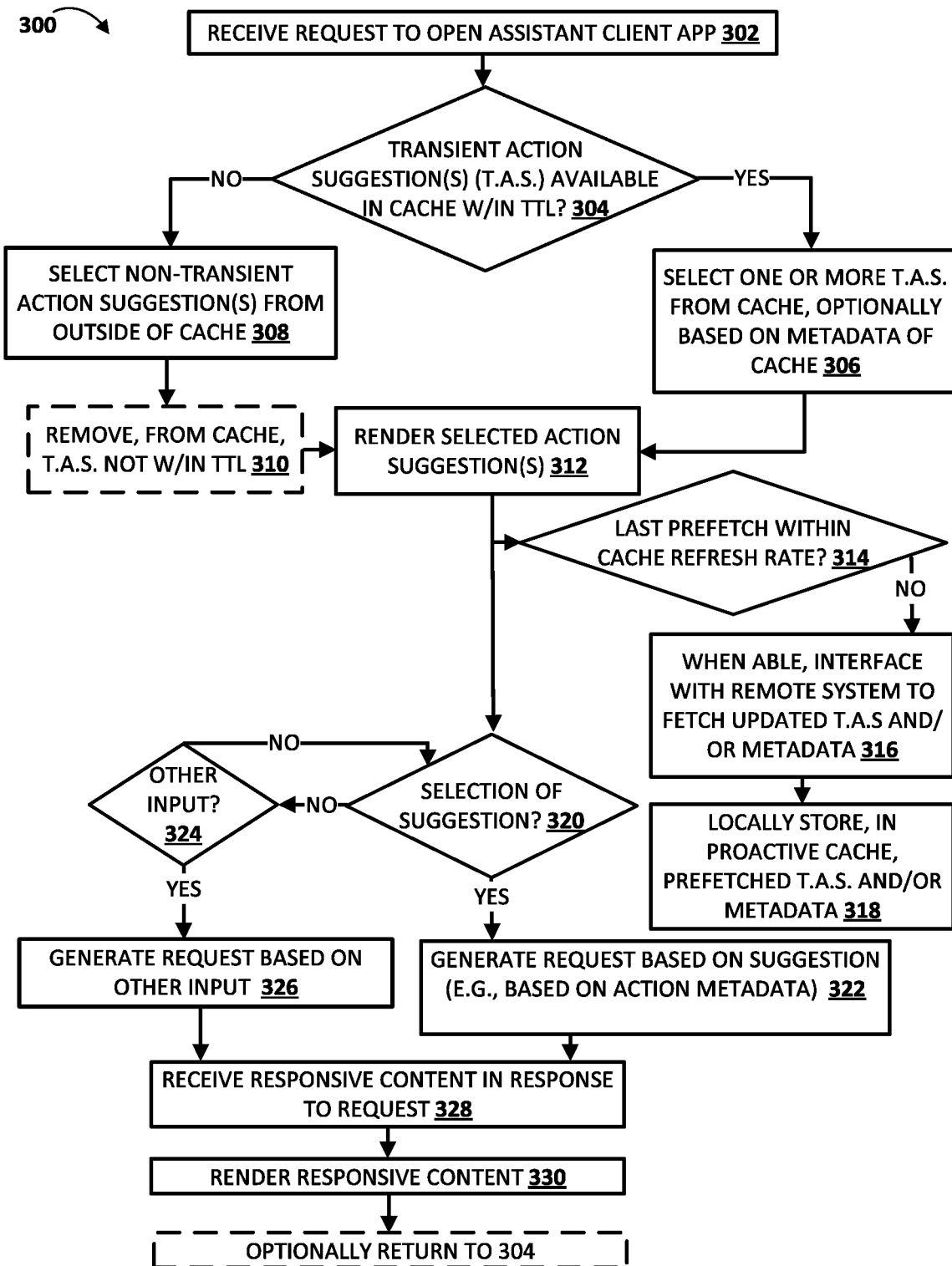
FIG. 3 depicts a flowchart illustrating an example method of prefetching and utilizing transient action suggestions and associated metadata, by an automated assistant application of a client device.

FIG. 3 is a flowchart illustrating an example method 300 of prefetching and utilizing transient action suggestions and associated metadata, by an automated assistant application of a client device. For convenience, the operations of the flowchart are described with reference to a system that performs the operations. This system may include various components of various computer systems, such as assistant client application 106 of feature phone 101. Moreover, while operations of method 300 are shown in a particular order, this is not meant to be limiting. One or more operations may be reordered, omitted, or added.

At block 302, the system receives a request to open an assistant client application. For example, the request can be certain user interface input received at a feature phone. For instance, the certain user interface input can be a long-press of a hardware button, and an operating system of the feature phone can provide the request to open the assistant client application, in response to detecting the long-press of the hardware button.

At block 304, the system determines whether transient action suggestion(s) are available in the proactive cache and satisfy a current time to live threshold. In one example, the system can compare the current time to live value (a reference timestamp) to timestamp metadata for the transient action suggestions of the proactive cache. In another example, the system can compare the combination of the timestamp metadata of the transient action suggestion(s) and the current time to live value to a current time or timestamp. In some implementations, block 304 can be performed upon opening of the assistant client application as the initial start up state will be a state at which transient action suggestions are to be provided. Utilization of the proactive cache in subsequent blocks can be particularly beneficial at start up, as transient action suggestions can be retrieved with minimal latency and without having to await active provision of action suggestions from a remote system. Moreover, transmitting a live request for action suggestions at start-up can be problematic in view of feature phone constraints and/or under certain network conditions.

If the decision at block 304 is yes, the system proceeds to block 306 and selects one or more transient action suggestions from the proactive cache. In some implementations, the selection is optionally based on metadata of the proactive cache, such as priority metadata for each of the transient action suggestions and/or rendering restriction metadata for one or more of the transient action suggestions.

If the decision at block 304 is no, the system proceeds to block 308 and selects one or more non-transient action suggestions that are stored locally outside of the cache. The system can also optionally, at block 308, remove, from the proactive cache, any of the transient action suggestions that do not satisfy the current time to live value.

At block 312, the system renders the selected action suggestions selected at block 306 or block 308.

At block 314, the system determines whether the last prefetch for transient action suggestions was within a current proactive cache refresh rate defined by current proactive cache refresh rate metadata. If not, at block 316 the system, when able (e.g., when assistant client application is idle), interfaces with a remote system to prefetch updated transient action suggestions and/or metadata. The system then proceeds to block 318 and locally stores, in the proactive cache, the transient action suggestions and/or metadata prefetched at block 316. Although block 314 is illustrated as occurring after block 312, it can occur at other points in the method 300 in other implementations. When possible in view of hardware and operating system constraints, blocks 314, 316, and/or 318 can optionally be performed in parallel with other block(s) of method 300.

After block 312, the system also, at blocks 320 and 324, monitors for either a selection of any one of the action suggestions rendered at block 312, or other input (e.g., typed or spoken input unrelated to any of the rendered action suggestion(s)).

If a rendered action suggestion is selected at block 320, the system proceeds to block 322 and generates a request based on the selected action suggestion. For example, the system can generate a request based at least in part on action metadata for the selected action suggestion.

If other input is received at block 326, the system proceeds to block 326 and generates a request based on the other input. For example, the system can generate a request based at least in part on captured audio data when the other input is spoken input, or based on typed data when the other input is typed input.

At block 328, the system receives responsive content in response to the request. For example, the request can be transmitted to cloud-based automated assistant components, and the responsive content received from the cloud-based automated assistant components in response. Also, for example, the request can be executed locally, and the responsive content received from and/or rendered by local component(s) (e.g., another app).

At block 330, the system renders the responsive content (e.g., audibly and/or graphically). The system can then optionally return to block 304.

Figure 4:
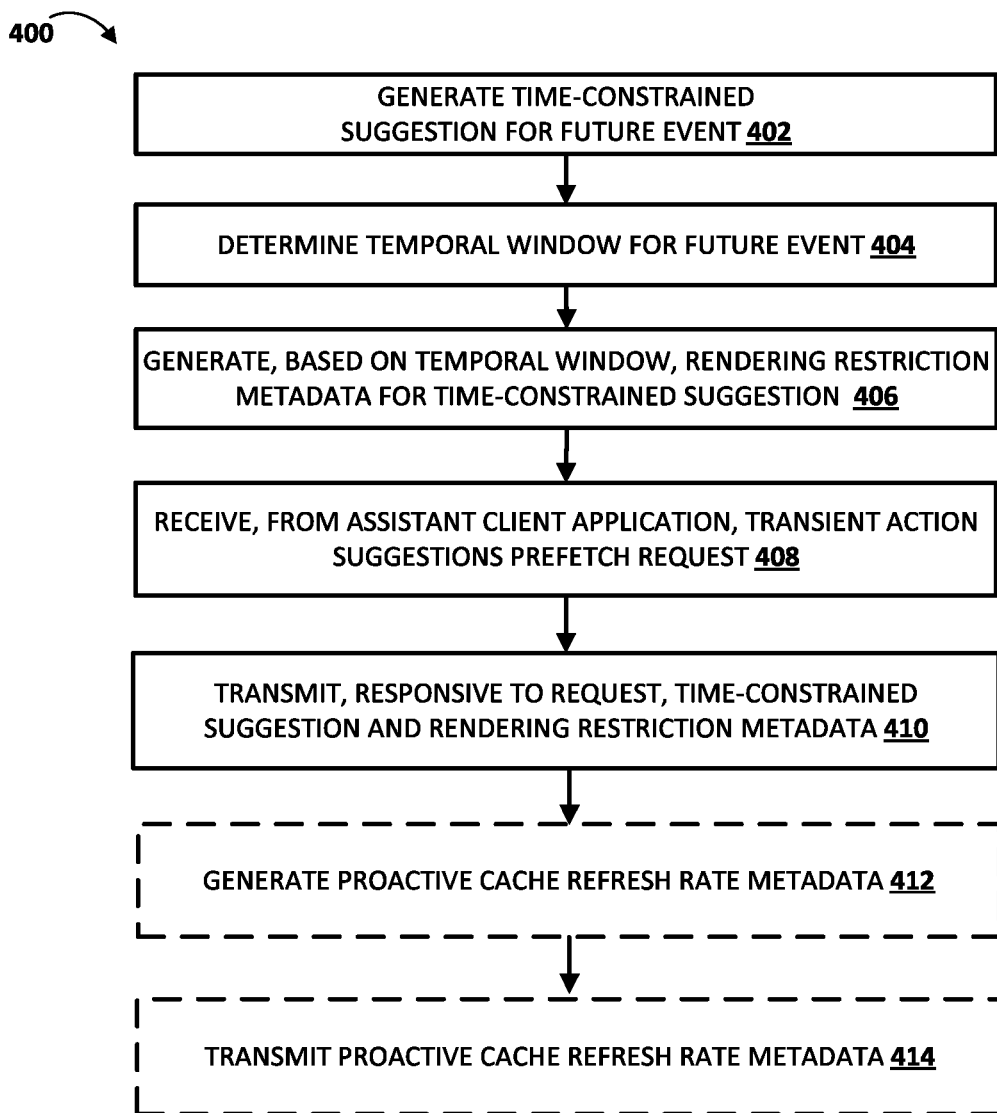
FIG. 4 depicts a flowchart illustrating an example method of generating a time-constrained suggestion and associated metadata, transmitting the time-constrained suggestion and associated metadata responsive to a transient action suggestions prefetch request, and optionally generating and transmitting cache refresh rate metadata.

FIG. 4 is a flowchart illustrating an example method 400 of generating a time-constrained suggestion and associated metadata, transmitting the time-constrained suggestion and associated metadata responsive to a transient action suggestions prefetch request, and optionally generating and transmitting cache refresh rate metadata. For convenience, the operations of the flowchart are described with reference to a system that performs the operations. This system may include various components of various computer systems, such as remote suggestions system 140 and/or remote configuration system 144. Moreover, while operations of method 400 are shown in a particular order, this is not meant to be limiting. One or more operations may be reordered, omitted, or added.

At block 402, the system generate a time-constrained suggestion for a future event. For example, the system can generate a time-constrained suggestion that is descriptive of the future event and of one or more assistant action(s) relevant to the future event.

At block 404, the system determines a temporal window for the future event. For example, the system can optionally interact with one or more additional systems to determine the temporal window, and/or can determine the temporal window based on one or more characteristics of the future event.

At block 406, the system generates, based on the temporal window, rendering restriction metadata for the time-constrained suggestion. In some implementations, the system determines multiple temporal windows for the future event at block 304, and generates the rendering restriction metadata based on the multiple temporal windows. The system can additional generate additional metadata for the time-constrained suggestion, such action metadata, timestamp metadata, and/or priority metadata.

At block 408, the system receives, from an assistant client application, a transient action suggestions prefetch request. For example, the system can receive the prefetch request from an assistant client application of a feature phone.

At block 410, the system transmits, responsive to the prefetch request of block 408, the time-constrained suggestion and the rendering restriction metadata. Other metadata associated with the time-constrained suggestion may optionally be transmitted. Moreover, in some implementations the time-constrained suggestion is included in a batch of transient action suggestions that are transmitted responsive to the prefetch request. Such a batch can include additional time-constrained suggestions and/or non-time-constrained suggestions.

At optional block 412, the system generates proactive cache refresh rate metadata. As described herein, the proactive cache refresh rate metadata can be generated based on various considerations such as network conditions, server conditions, generation of updated rendering restriction metadata for the time-constrained suggestion, and/or other factor(s) related to transient action suggestion(s) of a batch optionally transmitted at block 410. As also described herein, the generated proactive cache refresh rate metadata can optionally be specific to a particular geographic region and/or to other constraint(s).

At optional block 414, the system transmits the proactive cache refresh rate metadata. For example, the system can transmit the proactive cache refresh rate metadata as part of the transmission of block 410, or asynchronously relative to the transmission of block 410. In some implementations where the transmission is asynchronous, it can be transmitted responsive to a separate configuration retrieval request. Also, in some implementations, transmission of the proactive cache refresh rate metadata can be contingent on the configuration retrieval request originating from a geographic region and/or other constraint(s) to which the proactive cache refresh rate metadata is optionally specific.

Figure 5:
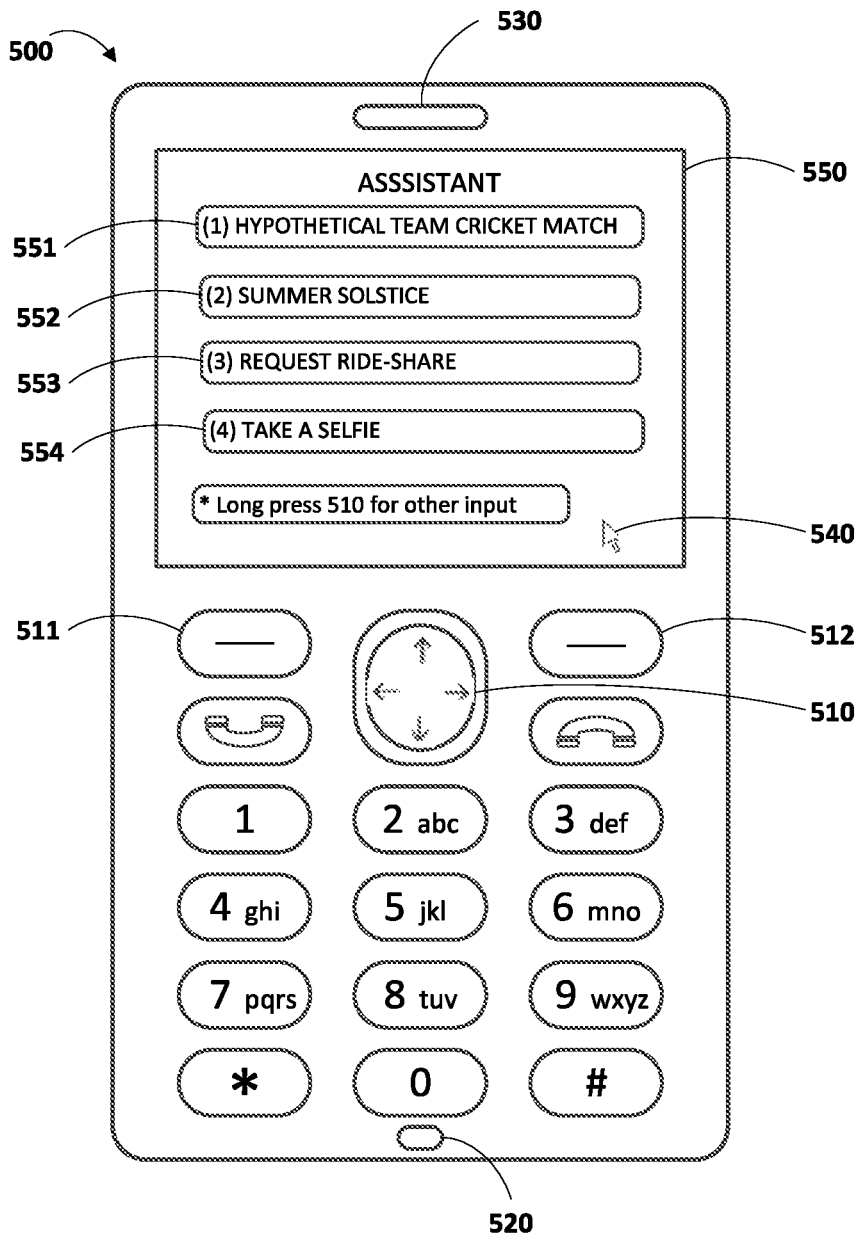
FIG. 5 illustrates an example of rendering transient action suggestions via an assistant client application of a feature phone.

Turning now to FIG. 5, an example is illustrated of rendering transient action suggestions 551-554 via an assistant client application of a feature phone 500. The feature phone 500 has a navigation button 510, a first selectable button 511, a second selectable button 512, a microphone 520, a speaker 530, a cursor 540, and a feature phone display 550. A cursor 540 is rendered on the display 550 along with the transient action suggestions 551-554 and a separate element indicating how other input (that is not a selection of a transient action suggestion) can be provided. Although a cursor 540 is illustrated, alternative symbols or other indications can be provided to indicate which area(s) of the display 550 are active.

FIG. 5 shows an example of the feature phone 500 after an assistant client application has been initially invoked. The transient action suggestions 551-554 are rendered based on the initial invocation state being a state in which transient action suggestions are desired. A corresponding number (1, 2, 3, 4) is illustrated beside each of transient action suggestions 551-554 and indicates that a user can select a corresponding selectable number hardware button (on the keypad) to select the suggestion. For example, pressing the "1" hardware button will cause transient action suggestion 551 to be selected. Additionally or alternatively, the navigation button 510 can be utilized to move the cursor 540 and select a corresponding suggestion, or to cycle through and select one of the suggestions (e.g., when a cursor is not provided). Other selection inputs can be used, such as others described herein.

The transient action suggestions 551, 552, and 553 are non-limiting examples of time-constrained suggestions. For example, transient action suggestion 551 can be rendered based on a current time conforming to one of multiple time windows for the cricket match, as defined by corresponding rendering restriction metadata. Also, for example, transient action suggestion 551 can be rendered based on a current day conforming to a time window (e.g., a particular day) for the summer solstice, as defined by corresponding rendering restriction metadata. Also, for example, transient action suggestion 551 can be rendered based on a current time and/or day of the week conforming to a time window for requesting a ride-share, as defined by corresponding rendering restriction metadata. The transient action suggestion 554 is a non-limiting example of a transient action suggestion that can include associated action metadata that enables performance of the corresponding assistant action locally at the feature phone 500.

Figure 6:
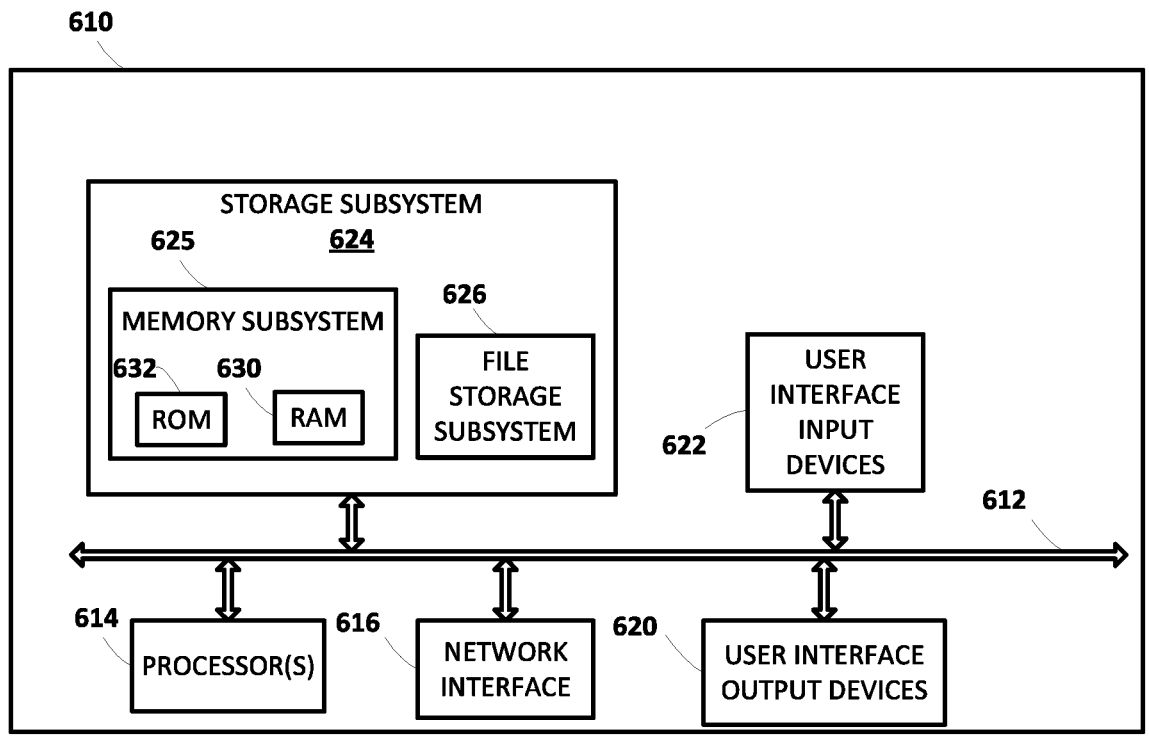
FIG. 6 illustrates an example architecture of a computing device.

FIG. 6 illustrates an example architecture of a computing device 610. The computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface input devices 622, user interface output devices 620, and a network interface subsystem 616. The input and output devices allow user interaction with the computing device 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computer system.

Storage subsystem 624 stores programming and data constructs that provide the functionality of some or all of the modules described herein. For example, the storage subsystem 624 may include the logic to perform one or more of the methods described herein.

These software modules are generally executed by processor 614 alone or in combination with other processors. Memory 625 used in the storage subsystem can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be optionally stored by the file storage subsystem 626 in the storage subsystem 624, or in other machines accessible by the processor(s) 614.

Bus subsystem 612 provides a mechanism for letting the various components and subsystems of the computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted is intended only as a specific example for purposes of illustrating some implementations. Many other configurations of computing device 610 are possible having more or fewer components than the computing device 610.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

In some implementations, a method performed by an assistant client application executed by one or more processors of a client device is provided, and the method includes, while the assistant client application is executing, interfacing with a remote system to prefetch transient assistant action suggestions, for the assistant client application, and corresponding metadata. The prefetched transient assistant action suggestions include a time-constrained suggestion associated with given metadata, of the corresponding metadata. The given metadata includes rendering restriction metadata that defines one or more temporal windows to which rendering of the time-constrained suggestion is restricted. The method further includes writing the prefetched transient assistant action suggestions, and the corresponding metadata, to a proactive cache in local storage of the client device. The method further includes, subsequent to writing the fetched transient assistant action suggestions, and the corresponding metadata, to the proactive cache in the local storage, and when the assistant client application is subsequently executing at the client device: determining that the assistant client application is in a state in which assistant action suggestions are to be provided. The method further includes, in response to determining that the assistant client application is in the state in which transient assistant action suggestions are to be provided: accessing the proactive cache in the local storage to select a subset of the transient assistant action suggestions. The subset includes at least the time-constrained suggestion. Accessing the proactive cache in the local storage to select the subset includes: selecting the time-constrained suggestion for inclusion in the subset based on determining that a current temporal condition conforms to at least one of the one or more temporal windows defined by the rendering restriction metadata of the time-constrained suggestion. The method further includes rendering the subset of the transient assistant action suggestions at the client device and via the assistant client application, including rendering the time-constrained suggestion. Further user input directed to the rendered time-constrained suggestion causes the assistant client application to initiate performance of a given assistant action that corresponds to the time-constrained suggestion.

These and other implementations of technology disclosed herein may optionally include one or more of the following features.

In some implementations, the corresponding metadata further includes timestamp metadata associated with one or more of the transient assistant action suggestions. The timestamp metadata defines a time of prefetching the transient assistant action suggestions or a time of generating, by the remote system, of the transient assistant action suggestions. In some versions of those implementations, the method further includes, subsequent to rendering the subset of the transient assistant action suggestions, and when the assistant client application is yet again subsequently executing: removing one or more of the transient assistant action suggestions from the proactive cache in the local storage based on the timestamp metadata exceeding a time to live threshold. In some of those versions, the method further includes, subsequent to rendering the subset of the transient assistant action suggestions, and when the assistant client application is yet again subsequently executing and is yet again in the state in which assistant action suggestions are to be provided: selecting, from outside the proactive cache in the local storage and based on the timestamp metadata exceeding a time to live threshold, at least one non-transient assistant action suggestion; and rendering the at least one non-transient assistant action suggestion via the assistant client application. The time to live threshold can be, for example: predefined at the assistant client application; included in the corresponding metadata prefetched from the remote system; or fetched, from the remote system or an additional remote system, asynchronously relative to interfacing with the remote system to prefetch transient assistant action suggestions.

In some implementations, the corresponding metadata further includes proactive cache refresh rate metadata associated with one or more of the transient assistant action suggestions. The proactive cache refresh rate metadata defines a duration during which the assistant client application is to refrain from interfacing with a remote system to prefetch updated transient assistant action suggestions.

In some implementations, the method further includes interfacing with the remote system or an additional remote system to fetch proactive cache refresh rate metadata. Interfacing to fetch proactive cache refresh rate metadata is asynchronous relative to interfacing with the remote system to prefetch transient assistant action suggestions. The proactive cache refresh rate metadata defines a duration during which the assistant client application is to refrain from interfacing with a remote system to prefetch updated transient assistant action suggestions. In some versions of those implementations, the interfacing to fetch the proactive cache refresh rate metadata occurs in a previous execution of the assistant client application without immediate implementation of the proactive cache refresh rate metadata. In some additional or alternative versions of those implementations, the method further includes, when the assistant client application is subsequently executing: determining, by the assistant client application and based on the proactive cache refresh rate metadata, to refrain from interfacing with the remote system to prefetch updated transient assistant action suggestions. Determining, by the assistant client application and based on the proactive cache refresh rate metadata, to refrain from interfacing with the remote system to prefetch updated transient assistant action suggestions can include: comparing the duration, defined by the proactive cache refresh rate metadata, to timestamp metadata associated with one or more of the transient assistant action suggestions. The timestamp metadata can define a time of fetching the transient assistant action suggestions or a time of generating, by the remote system, of the transient assistant action suggestions. In some additional or alternative versions of those implementations, the method further includes when the assistant client application is yet again subsequently executing: determining, by the assistant client application and based on the proactive cache refresh rate metadata, to again interface with the remote system to prefetch updated transient assistant action suggestions; again interfacing with the remote system to prefetch the updated transient assistant action suggestions and corresponding updated metadata; and replacing, in the proactive cache in the local storage, the transient assistant action suggestions and the corresponding metadata, with the updated transient assistant action suggestions and the corresponding updated metadata. The corresponding updated metadata can include updated proactive cache refresh rate metadata or the updated proactive cache refresh rate metadata can be fetched asynchronously relative to interfacing with the remote system to prefetch the updated transient assistant action suggestions and corresponding updated metadata. The updated proactive cache refresh rate metadata can define an updated duration during which the assistant client application is to refrain from interfacing with the remote system to fetch updated transient assistant action suggestions. The updated duration can differ from the duration. The updated transient action suggestions can optionally include another occurrence of the time-constrained suggestion with altered given metadata, of the updated corresponding metadata. The altered given metadata can include updated rendering restriction metadata that defines one or more updated temporal windows to which rendering of the time-constrained suggestion is restricted. One or more of the updated temporal windows differ from the temporal windows of the rendering restriction metadata.

In some implementations, the time-constrained suggestion includes text that is descriptive of the given assistant action that corresponds to the time-constrained suggestion, and rendering the time-constrained suggestion includes displaying the text, and the further user input includes selection of a hardware button of the client device. In some of those implementations, the given metadata further includes action metadata that is mapped, at the remote system, to the given assistant action. The action metadata includes less bytes than the text, and in initiating performance of the given assistant action the assistant client application transmits the action metadata to the remote system in lieu of the text.

In some implementations, the further user input includes spoken input that corresponds to the time-constrained suggestion.

In some implementations, interfacing with the remote system to prefetch the transient assistant action suggestions and the corresponding metadata is in response to determining the assistant client application is idle.

In some implementations, interfacing with the remote system to prefetch the transient assistant action suggestions and the corresponding metadata occurs when the assistant client application is executing in the foreground of the client device.

In some implementations, method performed by one or more remote servers in selective network communication with an assistant client application executed by one or more processors of a client device is provided. The method includes generating a time-constrained transient assistant action suggestion for a future event having dynamic temporal features. The method further includes determining, based on interfacing with one or more remote systems, at least one temporal window for the dynamic temporal features of the future event. The method further includes generating rendering restriction metadata for the time-constrained transient assistant action suggestion based on the temporal window. The rendering restriction metadata constrains rendering of the time-constrained transient assistant action suggestion to the at least one temporal window. The method further includes generating proactive cache refresh rate metadata for the time-constrained transient assistant action suggestion based on one or more characteristics of the future event. The proactive cache refresh rate metadata defines a duration during which the assistant client application is to refrain from interfacing with a remote system to prefetch updates for at least the time-constrained transient assistant action suggestion. The method further includes receiving, from the assistant client application of the client device, a transient action suggestions prefetch request and providing, in response to the transient action suggestions prefetch request, at least the time-constrained transient assistant action suggestion and the rendering restriction metadata. The method further includes providing in response to the transient action suggestions prefetch request or an additional asynchronous request from the assistant client application, the proactive cache refresh rate metadata for the time-constrained transient assistant action suggestion.

These and other implementations of the technology can optionally include one or more of the following features.

In some implementations, generating the proactive cache refresh rate metadata occurs subsequent to providing the time-constrained transient assistant action suggestion and the rendering restriction metadata, and is responsive to determining the one or more characteristics of the future event has changed. In those implementations, providing the proactive cache refresh rate metadata can be in response to the additional asynchronous request.

In some implementations, a method performed by one or more remote servers is provided and includes generating transient assistant action suggestions and receiving, from corresponding assistant client applications of a plurality of client devices in a geographic area, corresponding transient action suggestions prefetch requests. The method further includes providing the transient action suggestions in response to each of the corresponding transient action suggestions prefetch requests. The method further includes determining a change in load at one or more of the remote servers and/or a change in one or more network conditions in the geographic area. The method further includes, in response to determining the change in the load and/or the change in the one or more network conditions: generating updated proactive cache refresh rate metadata that defines a duration during which the corresponding assistant client applications are to refrain from interfacing with one or more of the remote servers to prefetch updated transient assistant action suggestions; and transmitting, to the corresponding assistant client applications and asynchronously with respect to any transient action suggestions prefetch requests, the updated proactive cache refresh rate metadata to the corresponding assistant client applications of the plurality of feature phones for supplanting any locally stored preexisting proactive cache refresh rate metadata.

What is claimed is:

1. A system comprising:
memory storing instructions;
one or more server processors executing the instructions to:
generate a time-constrained transient assistant action suggestion for a future event, the time-constrained transient assistant action suggestion comprising visual content that is descriptive of an action for the future event;
determine, based on one or more features of the future event, one or more temporal windows for the future event;
generate, based on the one or more temporal windows, rendering restriction metadata for the time-constrained transient assistant action suggestion,
wherein the rendering restriction metadata constrains rendering of the time-constrained transient assistant action suggestion to the one or more temporal windows;
generate action metadata for the time-constrained transient assistant action suggestion, wherein the action metadata differs from the visual content that is descriptive of the action for the future event;
provide, to a user device and over a network and prior to occurrence of any of the temporal windows defined by the rendering restriction metadata, the time-constrained transient assistant action suggestion along with the rendering restriction metadata and the action metadata,
wherein providing the time-constrained transient assistant action suggestion and the rendering restriction metadata and the action metadata causes an application of the user device to:
visually render the visual content of time-constrained transient assistant action suggestion responsive to determining that a corresponding current temporal condition conforms to a corresponding one of the one or more temporal windows defined by the rendering restriction metadata, and
in response to a user selection of the transient assistant action suggestion when it is visually rendered, utilize the action metadata in initiating performance of the action for the future event.

2. The system of claim 1, wherein the action metadata comprises less bytes than the visual content.

3. The system of claim 2, wherein the content comprises text that is descriptive of the future event and an image that is descriptive of the future event.

4. The system of claim 3, wherein the action metadata is mapped, at the system or an additional system remote from the user device, to the action for the future event.

5. The system of claim 4, wherein in utilizing the action metadata in initializing performance of the action for the future event, the user device is to transmit the action metadata to the system or the additional system, without transmitting the content to the system or the additional system.

6. The system of claim 1, wherein the action is a local action locally executable at the user device, and wherein the action metadata is utilized directly by the application of the user device to perform the action.

7. The system of claim 6, wherein the visual content is not directly executable by the user device to execute the action.

8. The system of claim 6, wherein in utilizing the action metadata in initiating performance of the action, the application is to interface with one or more additional applications of the user device.

9. The system of claim 1, wherein the one or more temporal windows defined by the rendering restriction metadata comprise co-occurrence of a specific date and a specific time or specific time window.

10. The system of claim 1, wherein the one or more temporal windows defined by the rendering restriction metadata comprise co-occurrence of a specific day of the week and a specific time window.

11. A user device comprising:
local storage;
a display;
memory storing instructions;
one or more processors, executing the instructions to:
while an assistant client application is executing at the user device, interface with a remote system to prefetch transient assistant action suggestions, for the assistant client application, and corresponding metadata, wherein the prefetched transient assistant action suggestions comprise:
a time-constrained suggestion associated with given metadata, of the corresponding metadata, the given metadata comprising:
rendering restriction metadata that defines one or more temporal windows to which rendering of the time-constrained suggestion is restricted, and
action metadata;
write the prefetched transient assistant action suggestions, and the corresponding metadata, to a proactive cache in the local storage;
subsequent to writing the fetched transient assistant action suggestions, and the corresponding metadata, to the proactive cache in the local storage, and when the assistant client application is subsequently executing at the user device:
access the proactive cache in the local storage to select a subset of the transient assistant action suggestions, the subset including at least the time-constrained suggestion, wherein in accessing the proactive cache in the local storage to select the subset one or more of the processors are to:
select the time-constrained suggestion for inclusion in the subset based on determining that a current temporal condition conforms to at least one of the one or more temporal windows defined by the rendering restriction metadata of the time-constrained suggestion; and
render the subset of the transient assistant action suggestions at the display and via the assistant client application, including rendering the time-constrained suggestion during the at least one of the one or more temporal windows based on the locally stored rendering restriction metadata;
detect that user input is directed to the rendered time-constrained suggestion; and
in response to detecting that the user input is directed to the rendered time-constrained suggestion, utilize the locally stored action metadata in initiating performance of a given assistant action that corresponds to the time-constrained suggestion.

12. The user device of claim 11, wherein the time-constrained suggestion comprises content that is descriptive of the given assistant action that corresponds to the time-constrained suggestion, and wherein rendering the time-constrained suggestion comprises displaying the content.

13. The user device of claim 12, wherein the content comprises one or both of: text and an image.

14. The user device of claim 13, wherein the action metadata differs from the content.

15. The user device of claim 14, wherein the action metadata comprises less bytes than the content, and wherein in initiating performance of the given assistant action one or more of the processors are to transmit the action metadata to the remote system in lieu of the content.

16. The user device of claim 14, wherein the given assistant action is a local assistant action, and wherein in utilizing the locally stored action metadata in initiating performance of the given assistant action one or more of the processors are to directly utilize the action metadata to execute the given assistant action.

17. The user device of claim 16, wherein the content is not directly executable by the user device to execute the given assistant action.

18. The user device of claim 16, wherein in interfacing with the remote system to prefetch the transient assistant action suggestions and the corresponding metadata, one or more of the processors are to interface with the remote system in response to determining the assistant client application is idle.

* * * * *